United States Patent [19]
Hazan et al.

[11] Patent Number: 5,243,172
[45] Date of Patent: Sep. 7, 1993

[54] COOK-TOP WITH AUTOMATIC CONTROLS

[75] Inventors: Jean-Pierre Hazan, Sucy-en-Brie; Rémy H. F. Polaert, Villecresnes; Jean-Louis Nagel, Limeil-Brevannes, all of France

[73] Assignee: U.S. Philips Corp., New York, N.Y.

[21] Appl. No.: 762,717

[22] Filed: Sep. 19, 1991

[30] Foreign Application Priority Data

Sep. 28, 1990 [FR] France .................................. 90 11981

[51] Int. Cl.$^5$ .......................... H05B 3/68; H05B 1/02
[52] U.S. Cl. .................................. 219/450; 219/453; 219/448; 219/518
[58] Field of Search ............... 219/450, 453, 448, 516, 219/518

[56] References Cited

U.S. PATENT DOCUMENTS

| | | | |
|---|---|---|---|
| 4,499,368 | 2/1985 | Payne | 219/452 |
| 4,577,181 | 3/1986 | Lipscher | 219/452 |
| 4,775,913 | 10/1988 | Ekblad | 219/519 |
| 4,942,046 | 7/1990 | Scott | 219/518 |
| 5,072,095 | 12/1991 | Hoffmann | 219/518 |

FOREIGN PATENT DOCUMENTS

| | | |
|---|---|---|
| 0374868 | 6/1990 | European Pat. Off. . |
| 2831858 | 2/1980 | Fed. Rep. of Germany ...... 219/218 |
| 3619762 | 12/1987 | Fed. Rep. of Germany . |
| 2188988 | 1/1974 | France . |
| 2465163 | 3/1981 | France . |

Primary Examiner—Bruce A. Reynolds
Assistant Examiner—Michael D. Switzer
Attorney, Agent, or Firm—Ernestine C. Bartlett

[57] ABSTRACT

A cook-top (10) is provided which includes at least one cooking section (12a) heated by at least one heating element which is activated by function controls (9). It includes at least one detector (20) which detects the presence of a cooking utensil on at least one cooking section (12a), the detector actuating a timing means (22) (24) in order to turn off or to reduce the heating of the cooking section when the utensil has been removed, and to turn on the heating of the cooking section when the utensil is put back on the cooking surface if the absence time has been shorter than a given time.

The detector may be responsive (20) (26) to the weight of the utensil and/or the temperature of the heating surface.

21 Claims, 5 Drawing Sheets

COOK-TOP WITH AUTOMATIC CONTROLS

FIELD OF THE INVENTION

The invention relates to a cook-top having at least one cooking section heated by at least one heating element which is actuated by function controls;
at least one presence detector which detects when at least one cooking section carries a utensil,
control means for deactivating or reducing the heating of said cooking section when the presence detector signals that the utensil has been removed.

BACKGROUND OF THE INVENTION

The cook-tops mentioned herein are preferably though not exclusively intended for domestic use. They comprise a plurality of localized cooking sections for receiving kitchen utensils whose contents are to be heated. The heating means generally comprise elements for heating by the Joule effect, by radiation or by induction. During use the heating element must be turned on, the power consumption must be adjusted, in some cases several times, and finally the heating element must be turned off.

When the utensil is lifted briefly the user does not necessarily intend to stop the operation of the heating element. This may have different consequences:
(a) there is an unnecessary electric power dissipation; and/or
(b) the temperature of the heating element, which then operates without load, is difficult to control and the element may produce radiation which may hinder or even harm the user by dazzling or scalding.

Therefore, it is desirable that the operation of the heating element can be controlled during said actions. Obviously, this should not have any consequences for the operation of the other heating elements.

U.S. Pat. No. 4,499,368 describes a system for detecting a removal of a utensil from a cook-top. For this purpose a time is measured during which the temperature of the utensil exceeds a threshold temperature. If this time exceeds a predetermined time the electric power supply to the cook-top is interrupted. The predetermined time intervals are adapted depending on whether the cook-top has been programmed for frying, boiling, stewing, etc. The time intervals are of the order of 10 to 20 minutes. These values are dictated by the requirement to preclude operation of a cook-top without a utensil or with an empty utensil.

However, such a cook-top does not provide any control of the operation during brief interruptions.

In the art of cooking there are several cases in which it is necessary to remove a pan briefly from a heating source, after which it is put back. If the user wishes to avoid the consequences of said radiation the heating element may be deactivated and may subsequently be reactivated by hand. This procedure soon turns out to be tedious.

The problem to be solved is to provide an automatic on/off function which precludes the adverse effects of said radiation when a utensil is removed temporarily. This automatic function should be effective, i.e. it should correctly distinguish the situation in which the utensil is removed temporarily and is subsequently put back from other situations and should respond accordingly.

SUMMARY OF THE INVENTION

According to the invention, this problem is solved in that a cook-top is provided which comprises a timing means which reactivates the heating of said cooking section when the presence detector detects (a) that the utensil has been put back onto said cooking section and (b) that the time of absence is less than a given time.

This has the advantage that the presence of a utensil can be detected in a continuous process. It may be considered to use a timing means to turn off the cooking section after the removal of the pan has been detected. However, a simple time constant is inadequate because either its duration is short and the heating element is turned off too soon and must be turned on by hand very frequently, or its duration is long and the radiation problems are not overcome. Likewise, an automatic and systematic actuation by the mere detection of an object may turn out to be dangerous in use because it is only required to put down the utensils without heating them or to put down, for example, a cookery book.

In accordance with the invention, when the electric power is only reduced, the cooking section may remain lit weakly, which attracts the user's attention without the risk of dazzling and which indicates that the cooking section is ready for automatic restarting when the utensil is put back onto the cooking section.

The given time during which the heating element can be reactivated upon removal of a heated pan can be determined in advance. Thus, if the time of absence is shorter than said given time the relevant heating element is reactivated as soon as the utensil is put back onto the cooking section. If the time of absence is longer than said given time the relevant heating element is not reactivated when the utensil is put back onto the cooking section. It is turned off completely if it had been set to a reduced power. Indeed, the given time is based on the fact that short absences relate to a similar sequence of operations whereas longer absences relate to different operations.

The presence detector may utilize different principles. It may detect the forces of gravity caused by the utensil and its contents. It may be a barrier comprising a light or ultrasonic emitter and receiver. The utensil is then placed in the path of the light beam or ultrasonic beam. It is also possible to detect the frequency variation of a high-frequency oscillator circuit capacitively or inductively. The placement or removal of a utensil will influence the oscillation frequency of this circuit, thereby enabling the presence or absence of the utensil to be detected.

This first level of automatic control presupposes a sufficiently alert user who will not even endeavour to place a utensil which is not heat resistant onto a cooking section which is still hot.

Instead of determining the value of the given time in advance it is possible to make it dependent upon a parameter of the operation which is in progress, for example the temperature of the cooking section. The cooking section then comprises a temperature detector, the given time being the time necessary to allow the temperature of the cooking section to decrease below a predetermined temperature.

In a simplified embodiment, if the presence detector detects the weight of the utensil (with or without its contents), the presence detector can carry out a coarse measurement of the weight of the load placed on the cooking section. However, preferably, in a more accurate embodiment, the presence detector is accurate enough to carry out a measurement of the weight. The automatic control allows for the substantial equality of the weight before the utensil is removed and after it has been put back. The heating of the cooking section is reactivated only if the variation of the weight of the utensil between the instant before and after the absence has an absolute value smaller than a predetermined limit. This is based on the assumption that the same pan is put back to proceed with cooking. Suitably, this allows certain blunders of the user, who may place an inappropriate utensil on the cooking section, to be ignored. In all the cases it is possible to operate with reduced power for a few instants during reactivation in order to allow the user to respond if necessary. It is also possible to provide an audible alarm (beep) or an optical alarm (flash) during this time.

BRIEF DESCRIPTION OF THE DRAWINGS

The invention will now be described in more detail, by way of non-limitative example, with reference to the following drawings, in which.

DETAILED DESCRIPTION OF PREFERRED EMBODIMENTS

In order to illustrate the variety of starting conditions (initial state) in response to the action of the user the situations described with reference to FIGS. 2A to 4B allow for different uses (with or without a time constant associated with this action). FIGS. 5A to 5E (see below) also illustrate some of these situations.

Figure 1:
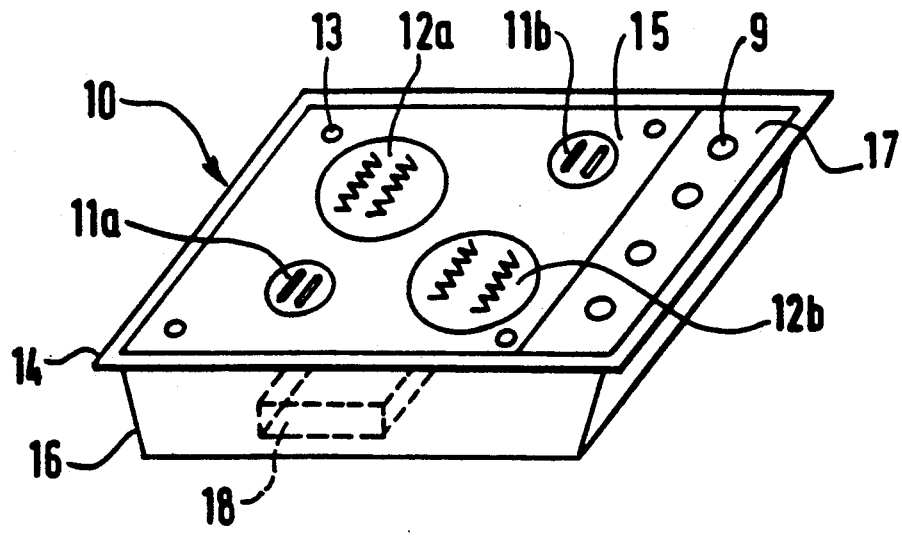
FIG. 1 is a diagram of a conventional cook-top.

FIG. 1 shows a conventional cook-top 10 comprising heating elements 11a, 11b, 12a, 12b arranged underneath a glass-ceramic plate 15 which is supported by a metal frame 14 and a casing 16. At one side the cook-top 10 has a zone 17 in which the function controls 9 are situated which are employed by the user for controlling the cook-top. These controls are for example buttons 9. By means of windows 13 it is possible to indicate whether a heating element is operative or when its temperature is still above a certain critical value. By means of control devices 18 the function commands activated by the user can be applied to the heating elements.

Figure 2A:
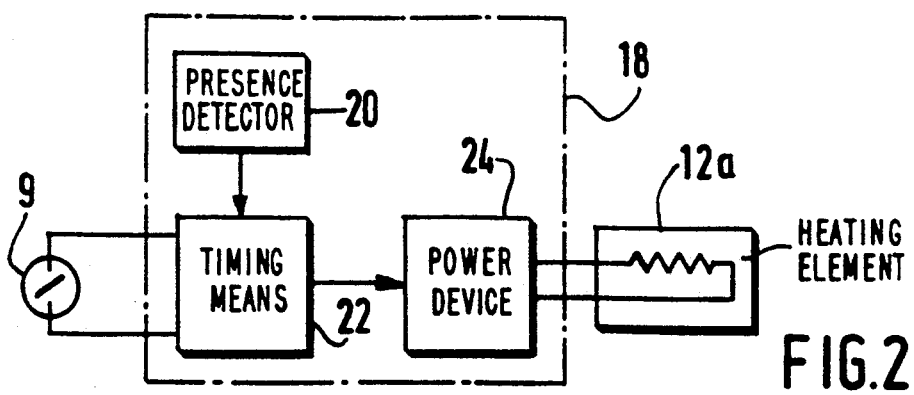
FIG. 2A is a diagram in accordance with the invention of control devices in the case of a presence detector which can be a weight detector.

FIG. 2A shows a diagram of the control devices 18 in accordance with the invention, which devices comprise for each heating element (for example 12a) a timing means 22, a presence detector 20 and a power device 24. The last-mentioned device influences the heating element 12a. The timing means 22 operates under control of the presence detector 20 and of the function control 9, for example a button.

Figure 2B:
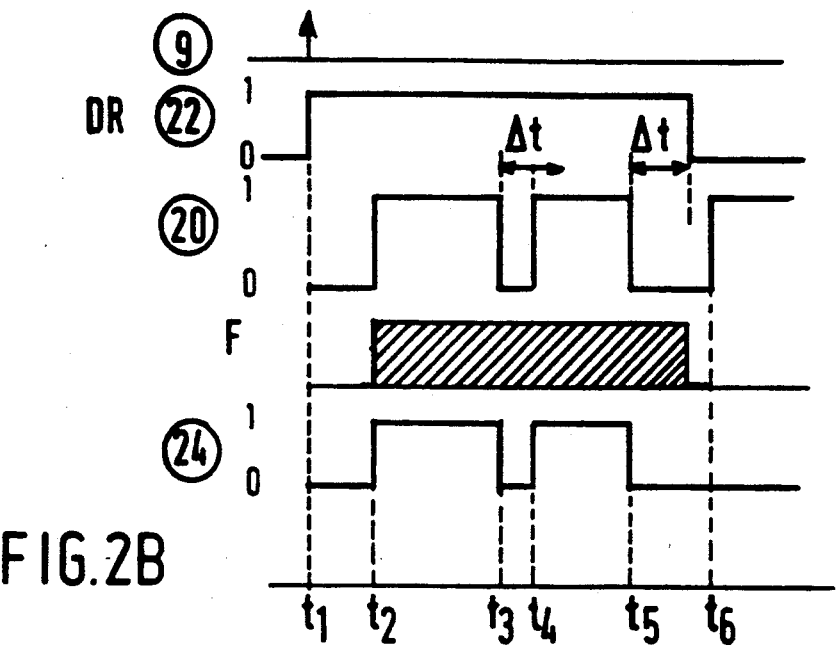
FIGS. 2B, 2C are two function diagrams corresponding to FIG. 2A in the case of a presence detector operating in accordance with the on/off principle and in the case of a presence detector operating by weight.

FIG. 2B shows the function diagram. At an instant $t_1$ the user actuates the button 9 for starting. This causes a flag DR to be set to the logic 1 state, which state is stored in for example a latch provided in the timing means 22. If at this instant $t_1$ no utensil has been placed on the heating element 12a the presence detector 20 indicates the absence of a utensil (0 state). The timing means is then blocked and no electric power (0 state) is supplied by the power device 24.

At the instant $t_2$ the presence detector 20 indicates the presence of a utensil (1 state). The timing means 22 supplies a command to the power device 24, which supplies electric power (1 state).

At the instant $t_3$ the utensil is removed (0 state). The electric power is then turned off. At the instant $t_4$ the utensil is put back (1 state). Since the time $t_3 t_4$ is shorter than a given time $\Delta t$ the timing means 22 now allows the electric power to be restored automatically.

At the instant $t_5$ the utensil is removed again (0 state) and is subsequently put back at the instant $t_6$ (1 state). Since the time interval $t_5 t_6$ is shorter than the given time the flag DR is reset to the 0 state at the end of the time interval $\Delta t$. The timing means 22 does not allow the electric power supply to the heating element to be restored. The time window F represents the availability of the automatic function of the timing means, i.e. the time interval in which automatic operation can be started by the user in combination with the validation of a given duration $\Delta t$.

Figure 2C:
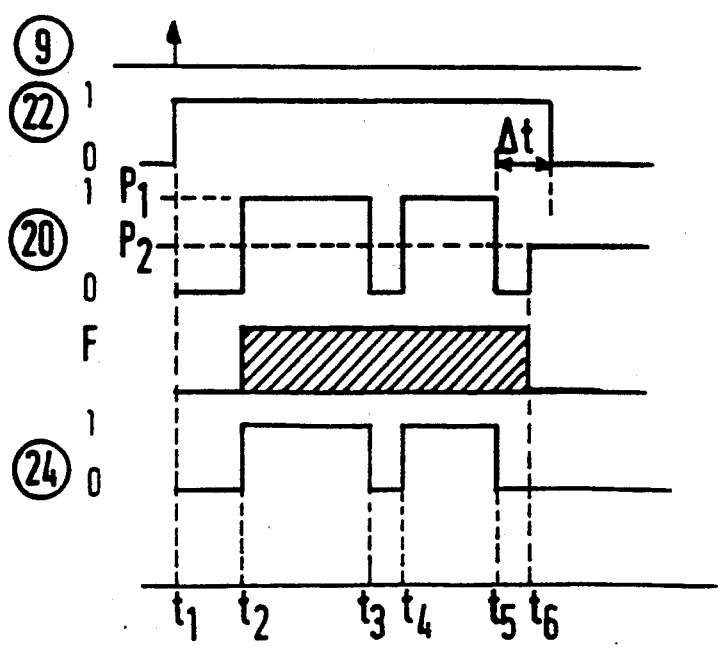

FIG. 2C shows another function diagram in the embodiment wherein the presence detector is a weight detector. Consequently, this detector can determine not only the presence but also the weight of the utensil (and its contents).

Between the instant $t_1$ and the instant $t_5$ the situation is the same as in FIGS. 2B and 2C, the difference being that the weight detector consecutively detects the same weight $P_1$. At the instant $t_6$ the utensil is put back but with a weight reduced to the value $P_2$. Although the time interval $t_5 t_6$ in FIG. 2C is shorter than the given time $\Delta t$ the electric power supply cannot be restored because the weight variation $|P_1-P_2|$ has an absolute value greater than a predetermined variation. This is an indication that the operation starting at the instant $t_6$ is not the continuation of the preceding operations. Therefore, manual restarting is necessary to validate this operation. The window F represents the availability of automatic restarting under the combined control of the user and the weight detector (in the present example the time $\Delta t$ is not involved).

The weight detector may be of the type described in U.S. Pat. No. 4,476,946. The cooking section is then carried by an arrangement of strain gauges which are strained under the weight of the utensil. The electric signals supplied by the strain gauges are used for determining the weight and for controlling the timing means 22 (FIG. 2A).

Figure 3A:
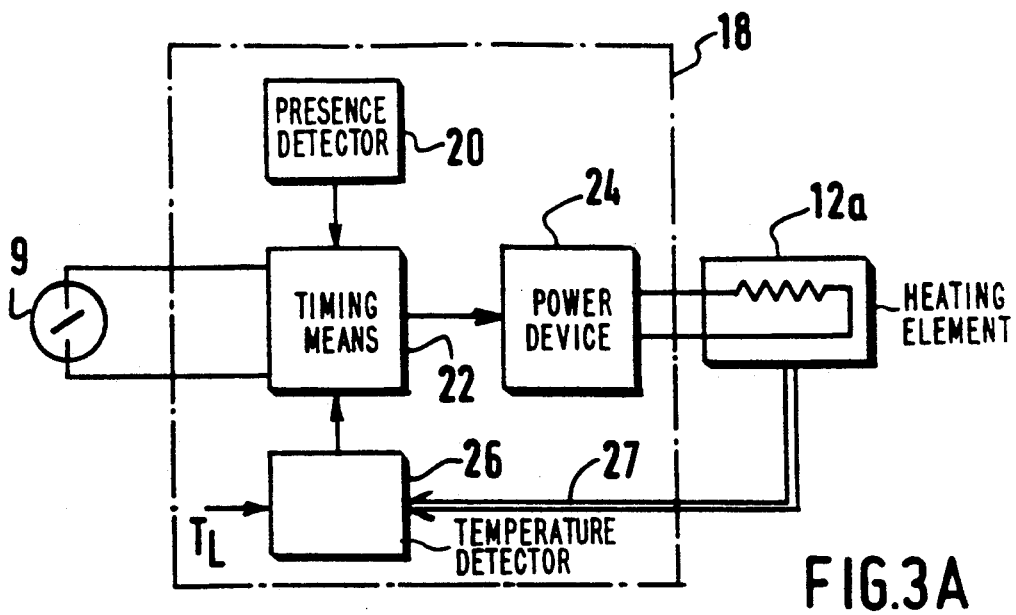
FIG. 3A is a diagram in accordance with the invention of control devices in the case of a presence detector and a temperature detector.

The diagram shown in FIG. 3A represents another embodiment of the invention. In addition to the elements shown in FIG. 2A the control device 18 comprises a temperature detector 26 which measures (connection 27) the temperature of the cooking section 12a.

Figure 3B:
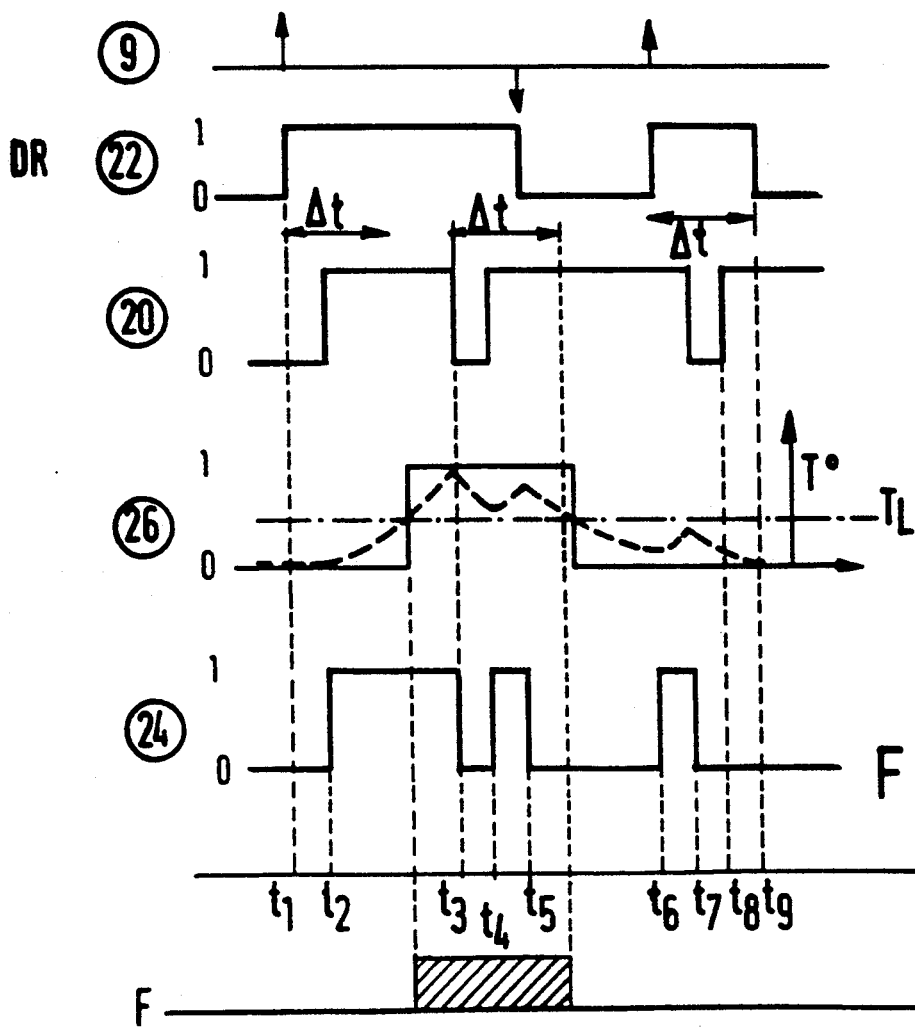
FIG. 3B is a function diagram corresponding to FIG. 3A.

The temperature detector 26 also controls the timing means 22 as shown in the function diagram in FIG. 3B.

At the instant $t_1$ the user actuates the button 9. This causes the flag DR to be set to the 1 state. At the instant $t_2$ the presence detector 20 detects a utensil (1 state), which causes the power device 24 to be activated (the time interval $t_1$ $t_2$ is shorter than $\Delta t$). The temperature detector 26 indicates an increasing temperature which exceeds the limit value $T_L$. At the instant $t_3$ the utensil is removed for a time smaller than $\Delta t$. As the temperature exceeds the limit $T_L$ the temperature detector supplies a logic 1 command which enables the timing means to restore the power supply to the heating element 24. At the instant $t_5$ the user turns off the heating element (DR goes to the 0 state), so that its temperature decreases below the threshold $T_L$. At the instant $t_6$ the user actuates the button 9. The timing means enables the electric power supply to be restored. At the instant $t_7$ the utensil is removed for a time interval $t_7$ $t_8$ shorter than $\Delta t$. However, as the temperature is below the limit temperature $T_L$ the timing means does not enable the power supply to the heating element to be restored. The flag DR is set to the 0 state at the end of the time interval $\Delta t$. As a result of this, an action by the user is needed to enable the heating to be turned on again. The window F represents the availability of the automatic restarting function in the present example.

Figure 4A:
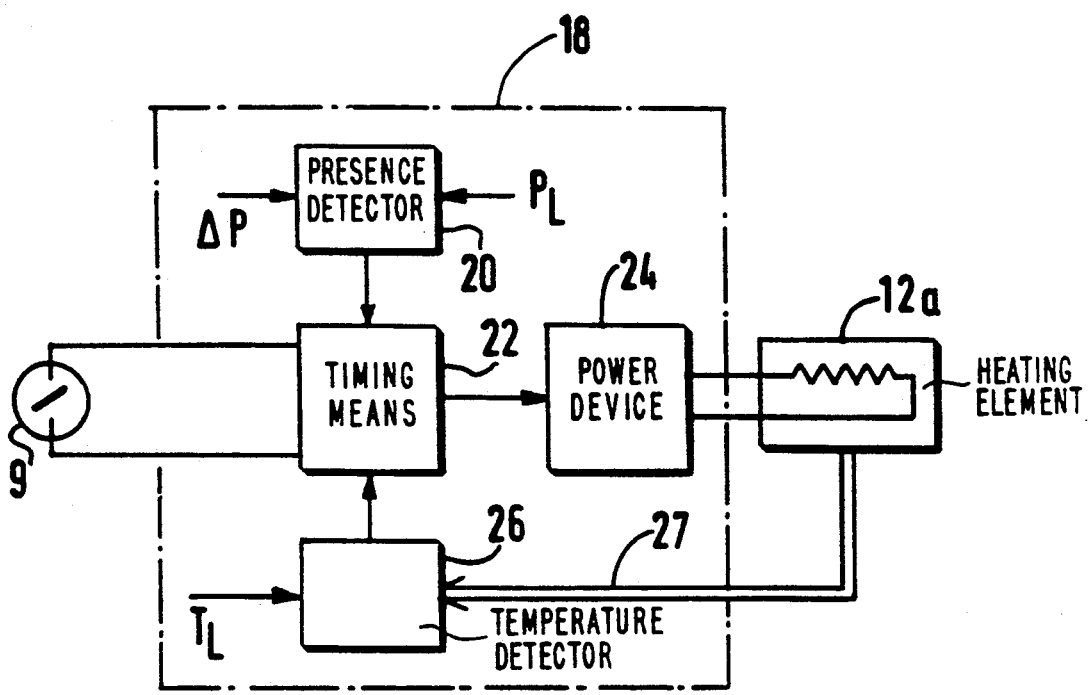
FIG. 4A is a diagram in accordance with the invention of control devices in the case of a weight detector and a temperature detector.

FIG. 4A illustrates the case in which at the same time a weight detector 20 and a temperature detector 26 are employed.

Figure 4B:
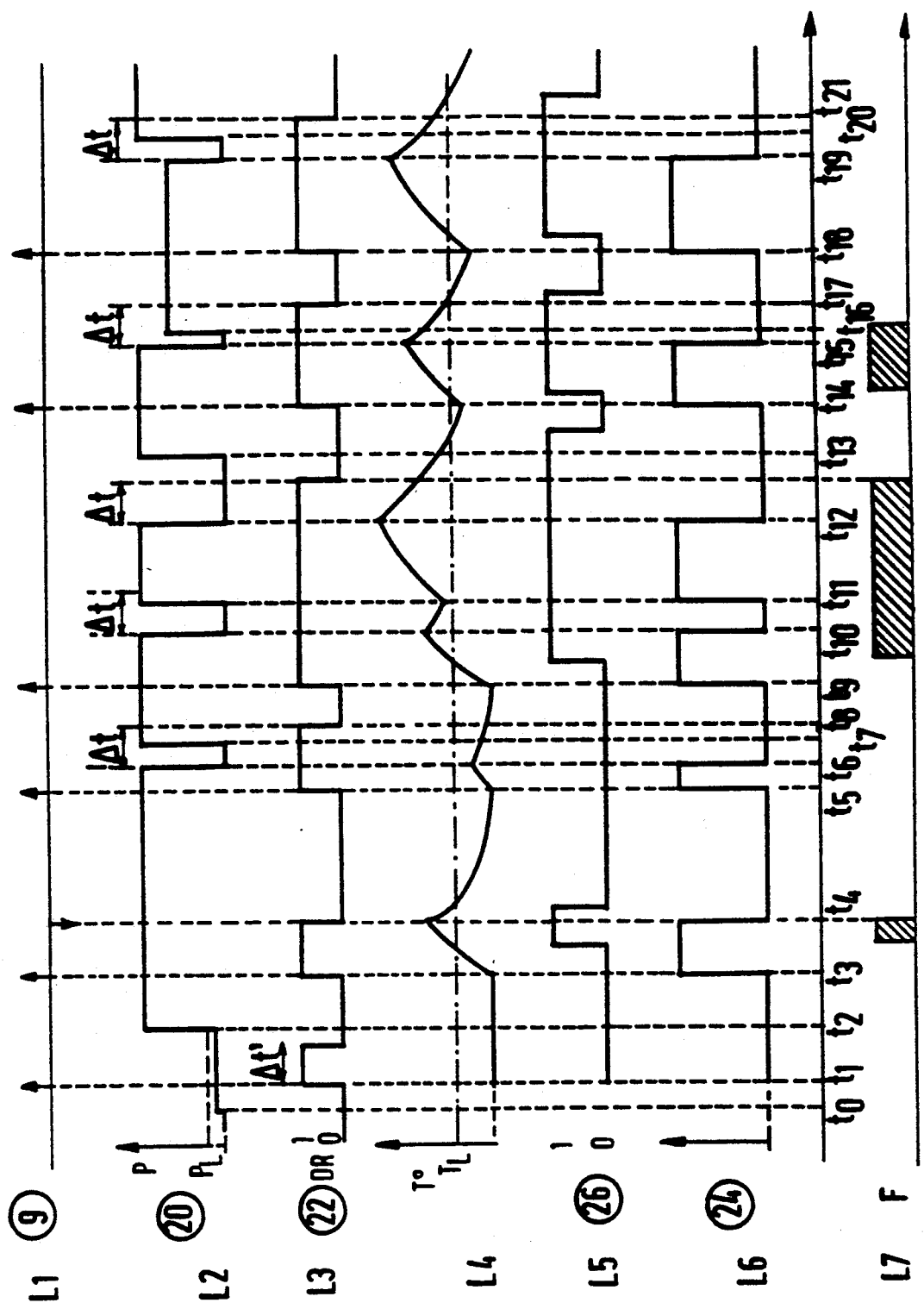
FIG. 4B is a function diagram corresponding to FIG. 4A.

FIG. 4B gives an example of a sequence of operations which illustrate different situations which may occur during use of an embodiment of the cook-top. In this example the weight detector 20 (FIG. 4A) has been programmed with a weight limit value $P_L$. Below this value the weight detector 20 does not validate any presence. The detector has also been programmed with a weight variation $\Delta P$ such that the weight detector 20 only vaidates a presence signal (applied to the timing means) if the variation between two successive weight measurements is smaller than $\Delta P$.

FIG. 4B shows from top to bottom:

L1—actuation of the control 9 by the user. An arrow pointing up represents a starting request and an arrow pointing down represents a stop request, L2—the value of the weight P determined by the weight detector 20, L3—the state of a flag DR, determined by the timing means 22, which takes into account the action performed by the user and the deactivation effected by the timing means, L4—the temperature of the cooking section determined by the temperature detector 26, L5—the signal supplied by the temperature detector 26, which signal has the logic 0 state when the temperature is below the limit temperature $T_L$ and which has the logic 1 state in the opposite case, L6—the electric power supplied by the power device 24 to the heating element, L7—the durations of the windows F, shown as hatched areas, during which automatic restarting is possible in the sequence of operations shown.

The sequence of operations is marked horizontally by the instants $t_0$ to $t_{21}$, which indicate as follows Instant $t_0$: a load of a weight smaller than $P_L$ is applied;

Instant $t_1$: the user performs a start. The flag DR is set to the 1 state. Since the weight is too low this action is ignored;

Instant $t_2$: a load of a weight higher than $P_L$ is applied but because the time interval $t_2-t_1$ is longer than a predetermined value $\Delta t'$ the flag DR is reset to zero and the heating is not turned on;

Instant $t_3$: the user performs a start. The weight is sufficient, the flag DR goes to 1 and the power device is activated;

Between $t_3$ and $t_4$: the temperature of the heating element increases and exceeds the limit value $T_L$;

Instant $t_4$: the user performs a stop: the power device is deactivated. The heating element cools down;

Instant $t_5$: the user performs a start. Since the weight is sufficient the power device is activated;

Instant $t_6$: the utensil is removed from the cooking section, the weight of the load is zero, the power device is deactivated. From this instant the timing means utilizes a time constant $\Delta t$;

Instant $t_7$: the same charge as above is placed on the cooking section with a time interval $t_6$ $t_7$ shorter than the time constant $\Delta t$. However, the temperature of the cooking section is below the limit $T_L$ and the power device remains deactivated;

Instant $t_8$: at the end of the time interval $\Delta t$ the flag DR is reset to the logic 0 state;

Instant $t_9$: the user performs a start, the power device is activated;

Instant $t_{10}$: the utensil is removed, the weight of the load becomes nil, the power device is deactivated;

Instant $t_{11}$: the utensil with the same weight is put back. The power device is reactivated automatically because the time interval $t_{10}$ $t_{11}$ is smaller than $\Delta t$;

Instant $t_{12}$: the utensil is removed, the power device is deactivated;

Instant $t_{13}$: the utensil with the same weight is put back but the time interval $t_{12}$ $t_{13}$ is longer than $\Delta t$. The power device is not reactivated. It is assumed that although the weight is the same the two operations spaced apart by more than $\Delta t$ are two separate operations;

Instant $t_{14}$: the user is compelled to restart by means of the control 9. The power device is activated;

Instant $t_{15}$: the utensil is removed from the cooking section, the power device is deactivated;

Instant $t_{16}$: the utensil is put back on the cooking section before the end of the interval $\Delta t$ but with a smaller weight, the difference in weight being larger than $\Delta P$. The power device is not reactivated automatically;

Instant $t_{17}$: at the end of the interval $\Delta t$ the flag DR returns to zero;

Instant $t_{18}$: the user performs a start, the power device is activated;

Instant $t_{19}$: the utensil is removed, the power device is deactivated;

Instant $t_{20}$: the utensil is put back onto the cooking section before the end of the interval $\Delta t$ but with a higher weight, the difference in weight being larger than $\Delta P$. The power device is not reactivated automatically;

Instant $t_{21}$: end of the interval $\Delta t$, the flag DR goes to 0.

FIG. 4B shows that in the sequence of operations given to illustrate the invention the availability windows for automatic restarting appear in three situations:

a first situation which starts between $t_3$ and $t_4$ when the temperature of the cooking section reaches $T_L$ and which ends when the user gives a stop command (instant $t_4$);

a second situation which starts between $t_9$ and $t_{10}$ when the temperature of the cooking section reaches $T_L$ and which ends between $t_{12}$ and $t_{13}$ at the end of the interval $\Delta t$, a third situation which starts between $t_{14}$ and $t_{15}$ when the temperature of the cooking section reaches $T_L$ and which ends at $t_{16}$ when a utensil having a substantially different weight is applied.

The invention relates to the automatic restarting operation to turn on the power devices when certain requirements described above are satisfied. The invention also relates to the operation of turning on a cooking section after a deactivated state of all the elements of the cook-top. This may be the actuation of the manual controls by the user or the actuation by the presence detector. Some situations relating thereto have been illustrated in the description of the preceding examples. A distinction can be made between the case in which a time constant intervenes and the case in which it does not intervene in the starting process. FIGS. 5A to 5E illustrate different situations which can be employed to effect starting. This is non-exhaustive and other situations may be considered without departing from the scope of the invention.

Figure 5A:
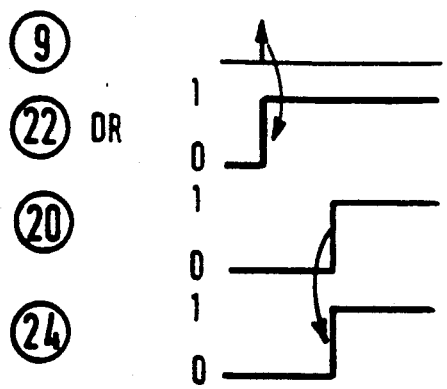
FIGS. 5A, 5B, 5C, 5D, 5E are diagrams representing different possibilities during starting of the heating plate from an initial state.

FIG. 5A represents the case in which the user action is indicated by means of the flag DR, this action being subsequently validated by the placement of a utensil detected by the presence detector to actuate the power device.

Figure 5B:
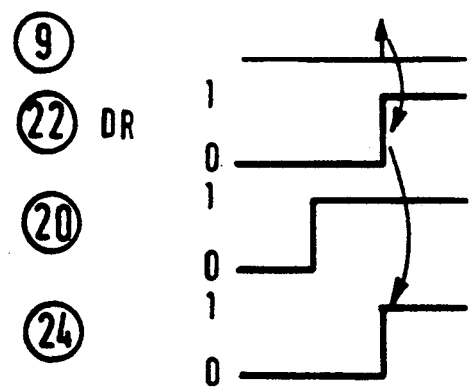

FIG. 5B represents the case in which the utensil is applied first and subsequently the power device is turned on by the user action by influencing the flag DR.

Figure 5C:
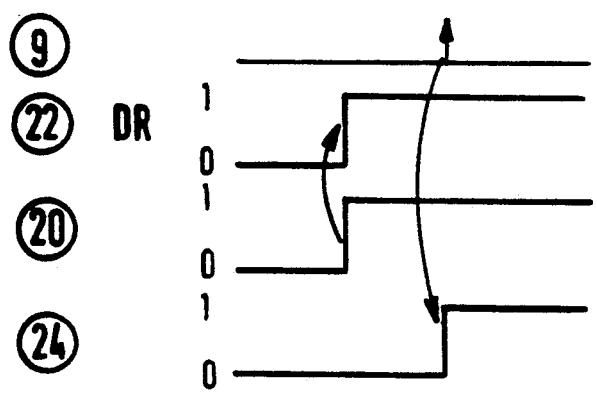

FIG. 5C represents the case in which the presence detector activates the flag DR, after which the subsequent user action can be validated to activate the power device.

Figure 5D:
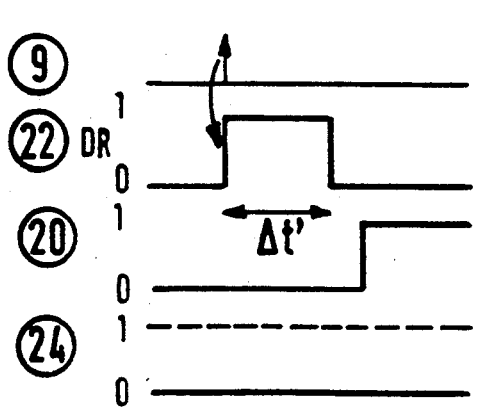
Figure 5E:
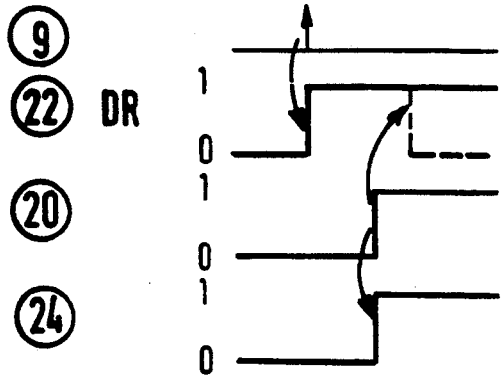

FIGS. 5D and 5E represent the case in which a predetermined time interval $\Delta T'$ is also used during starting. In this case the user action (or the action of the presence detector) initiates a time constant $\Delta t'$ in the timing means. If the presence detector (or the user action) appears after the end of $\Delta t'$ (FIG. 5D) the power device will not be activated. This constitutes a safety measure. The flag DR returns to the logic 0 state at the end of $\Delta t'$. If the presence detector (or the user action) appears before the end of $\Delta t'$ (FIG. 5E) the power device is activated, the second of the two actions also serving to maintain the flag DR in its validated state (1 state).

The starting operation which presumes a cold cooking section therefore does not take into account the temperature of the cooking section. On the other hand, the weight measurement (for example, at the instant $t_1$ in the case of FIG. 4B) may be taken into account. Those skilled in the art will be able to envisage other situations without departing from the inventive scope.

The time during which the time constant is operative (state of the timing means) can be indicated to the user by means of a pilot light.

We claim:

1. A cook-top (10) having at least one cooking section (12a) heated by at least one heating element which is actuated by function controls (9),
    at least one presence detector (20) which detects when at least one cooking section (12a) carries a utensil, and
    control means (18) for deactivating or reducing the heating of said cooking section when the presence detector (20) signals that the utensil has been removed,
characterized in that it comprises:
    a timing means (22) which reactivates the heating of said cooking section when the presence detector (20) detects that the utensil has been put back onto said cooking section and that the time of absence is smaller than a given time.

2. A cook-top as claimed in claim 1, wherein the cooking section further comprises a temperature detector (26), the given time being the time necessary to allow the temperature of the cooking section to decrease below a predetermined temperature.

3. A cook-top as claimed in claim 1, wherein the presence detector (20) detects the weight of the utensil.

4. A cook-top as claimed in claim 3, wherein said reactivation of the heating of the cooking section takes place only if the variation of the weight of the utensil between the instants before and after the absence has an absolute value that is less than a predetermined limit.

5. A cook-top as claimed in claim 1, wherein the presence detector (20) is a detector comprising a light or ultrasonic emitter and receiver.

6. A cook-top as claimed in claim 1, wherein the presence detector is either a capacitive detector or an inductive detector.

7. A cook-top as claimed in claim 1, wherein during starting from the rest condition the action of the user or the action of the presence detector is subject to a delay.

8. A cook-top as claimed in claim 3, wherein starting from the rest condition can be effected only when the weight of the utensil is higher than a predetermined limit.

9. A cook-top as claimed in claim 2, wherein the presence detector (20) detects the weight of the utensil.

10. A cook-top as claimed in claim 2, wherein the presence detector (20) is a detector comprising a light or ultrasonic emitter and receiver.

11. A cook-top as claimed in claim 2, wherein the presence detector is either a capacitive detector or an inductive detector.

12. A cook-top as claimed in claim 2, wherein during starting from the rest condition the action of the user or the action of the presence detector is subject to a delay.

13. A cook-top as claimed in claim 3, wherein during starting from the rest condition the action of the user or the action of the presence detector is subject to a delay.

14. A cook-top as claimed in claim 4, wherein during starting from the rest condition the action of the user or the action of the presence detector is subject to a delay.

15. A cook-top as claimed in claim 5, wherein during starting from the rest condition the action of the user or the action of the presence detector is subject to a delay.

16. A cook-top as claimed in claim 6, wherein during starting from the rest condition the action of the user or the action of the presence detector is subject to a delay.

17. A cook-top as claimed in claim 3, wherein starting from the rest condition can be effected only when the weight of the utensil is higher than a predetermined limit.

18. A cook-top as claimed in claim 4, wherein starting from the rest condition can be effected only when the weight of the utensil is higher than a predetermined limit.

19. A cook-top as claimed in claim 5, wherein starting from the rest condition can be effected only when the weight of the utensil is higher than a predetermined limit.

20. A cook-top as claimed in claim 6, wherein starting from the rest condition can be effected only when the weight of the utensil is higher than a predetermined limit.

21. A cook-top as claimed in claim 7, wherein starting from the rest condition can be effected only when the weight of the utensil is higher than a predetermined limit.

* * * * *